(12) United States Patent
Iovanna et al.

(10) Patent No.: US 7,539,210 B2
(45) Date of Patent: May 26, 2009

(54) DYNAMIC ROUTING IN PACKET-SWITCHING MULTI-LAYER COMMUNICATIONS NETWORKS

(75) Inventors: Paola Iovanna, Rome (IT); Roberto Sabella, Rome (IT); Pietro Tou, Rome (IT); Gianpaolo Oriolo, Rome (IT)

(73) Assignee: Telefonaktiebolaget L M Ericcson (Publ), Stockholm (SE)

( * ) Notice: Subject to any disclaimer, the term of this patent is extended or adjusted under 35 U.S.C. 154(b) by 397 days.

(21) Appl. No.: 10/514,584

(22) PCT Filed: May 17, 2002

(86) PCT No.: PCT/EP02/05518

§ 371 (c)(1),
(2), (4) Date: Jul. 14, 2005

(87) PCT Pub. No.: WO04/002078

PCT Pub. Date: Dec. 31, 2003

(65) Prior Publication Data

US 2006/0209785 A1  Sep. 21, 2006

(51) Int. Cl.
*H04J 3/22* (2006.01)
(52) U.S. Cl. ....................................... 370/468
(58) Field of Classification Search ................ 370/230, 370/468, 229, 238, 395, 389; 398/7; 709/227, 709/238
See application file for complete search history.

(56) References Cited

U.S. PATENT DOCUMENTS

| | | | |
|---|---|---|---|
| 5,398,012 A * | 3/1995 | Derby et al. | 370/238 |
| 5,784,358 A * | 7/1998 | Smith et al. | 370/230 |
| 6,028,860 A * | 2/2000 | Laubach et al. | 370/395.64 |
| 6,940,814 B1 * | 9/2005 | Hoffman | 370/235 |
| 7,065,044 B2 * | 6/2006 | Wang et al. | 370/229 |
| 7,155,120 B1 * | 12/2006 | Ofek et al. | 398/7 |
| 7,200,120 B1 * | 4/2007 | Greenberg et al. | 370/254 |
| 7,289,456 B2 * | 10/2007 | Gupta et al. | 370/254 |
| 2002/0051449 A1 * | 5/2002 | Iwata | 370/389 |
| 2002/0059432 A1 * | 5/2002 | Masuda et al. | 709/227 |
| 2002/0156914 A1 * | 10/2002 | Lo et al. | 709/238 |

OTHER PUBLICATIONS

Hedrick: "RFC1058: Routing Information Protocol" 'Online! Jun. 1998, IETF, Internet XP002233127 Retrieved from the Internet: <URL: ftp://ftp.isi.edu/in-notes/rfc1058.txt> 'retrieved on Feb. 27, 2003! p. 2, line 23-line 25; p. 7, paragraph 5-paragraph 6; p. 9, line 12-line 13; p. 10, line 19-p. 11, line 2; p. 11, line 22-line 38.

Wang Z., Crowcroftj.: "Quality-of-Service routing for supporting multimedia applications" IEEE Journal on Selected Areas in Communication, vol. 14, No. 7,—Sep. 1996 pp. 1228-1234, XP002233125 p. 1228, left-hand colum, line 1-p. 1229, right-hand column, line 1, p. 1230, paragraph D—p. 1232, left-hand column, line 30.

(Continued)

*Primary Examiner*—Anh-Vu Huynh Ly

(57) ABSTRACT

A method is provided for routing data packets across a multi-layer network which includes a plurality of nodes, a logical level provided with a plurality of logical links and a physical level provided with a plurality of physical links, each of the logical links corresponding to at least one of the physical links, the method comprising the steps of assigning a weight to each logical link with respect to a first critical constraint in the logical level, refining the weight assigned to each logical link with respect to a second critical constraint in the physical level and, based on the weights assigned to each link, computing a path at the logical level connecting a start node to an end node for the transport of the data packets.

13 Claims, 6 Drawing Sheets

OTHER PUBLICATIONS

Kodialam M., Lakshman T.V.: "Intergrated dynamic IP and wavelength routing in IP over WDM networks" IEEE INFOCOM 2001, -2001 pp. 358-366, XP002233126 p. 358-p. 366.

Thiagarajan S; Somani A K: Traffic Groming for Survivable WDM Mesh Networks: SPIE Proceedings, vol. 4599, No. 4599-5, Aug. 20-24, 2001, pp. 1-12, XP002243314 Bellingham, WA, US p. 7, line 41-line 42; p. 8, line 3-line 5.

Mokhtar A et al: "Adaptive Wavelength Routing in All-Optical Networks" IEEE / ACM Transactions on Networking, IEEE Inc. New York, US, vol. 6, No. 2, Apr. 1, 1998, pp. 197-206, XP000751632 ISSN: 1063-6692 p. 199, left-hand column, line 20-line 28;p. 199, right-hand column, line 27-line 33.

Hedrick: "RFC1058: Routing Information Protocol" Online! Jun. 1998, IETF, Internet ; XP002233127, pp. 1-11.

Thiagarajan S, et al., "Traffic Grooming for Survivable WDM Mesh Networks" Spie Proceedings, vol. 4599, No. 4599-5; Aug. 20-24, 2001, pp. 1-12, XP002243314, Bellingham, WA, US.

Mokhtar, A. et al., "Adaptive Wavelength Routing In All-Optical Networks" IEEE / ACM Transactions on Networking, IEEE, Inc. New York, USA, vol. 6, No. 2; Apr. 1, 1998, pp. 197-206, XP000751632; ISSN: 1063-6692.

* cited by examiner

DYNAMIC ROUTING IN PACKET-SWITCHING MULTI-LAYER COMMUNICATIONS NETWORKS

TECHNICAL FIELD

The present invention relates to packet-switching communications networks and, more particularly, to routing strategies in multi-layer networks.

BACKGROUND ART

In recent years, the fast growing of datacom networks and the large and ever-increasing amount of services made available to the users over such networks, particularly over the Internet, have led to a remarkable growth of traffic which is heavily affecting network performance.

As a matter of fact, current architectures of backbone networks, which were originally designed to support telephone traffic, are inadequate to support huge volumes of Internet data traffic and, ideally, should be replaced by technically advanced, state of the art hardware networks providing sufficient speed and bandwidth to cope with today's and tomorrow's data traffic needs.

Unfortunately, cost is a major issue which is slowing down, if not preventing, the hardware modernisation process: the common feeling is that investments would be too high with respect to expected revenues.

As a consequence, designs of next generations networks (NGNs), although taking into account all critical requirements, are still be based on traditional criteria.

The main requirement for a successful NGN is thus to be seen in the exploitation of the currently available hardware means and available bandwidth thereof, wherein the term bandwidth is to be intended in a broad sense, including data transfer capacity of a communications system, link capacity, node throughput and so on.

Effective use of the available bandwidth can be obtained by means of traffic engineering solutions, which is the possibility of handling network resources in a flexible and dynamic way in order to cope with traffic demand varying with time, optimising the usage of available resources and employing effective routing strategies.

Generally speaking most communications networks are designed on a multi-layer architecture using the well known seven-layer architecture as set out by the Open Systems Interconnection (OSI) and standardised by the International Standards Organization (ISO).

Each of the seven layers provides for a progressive level of abstraction, starting from layer 1, or physical layer, to level 7, the application layer, going through the data link layer, the network layer, the transport layer, the session layer, the presentation layer and the application layer.

Moreover, most of today's networks, including the networks implementing the Internet, use a number of well known and widely available network layer protocols for packet routing and flow control, which is performed at the network layer, and a number of data link layer protocols for error checking or performing functions that make reliable connection between two nodes.

Referring again to a most significant datacom network, the Internet transport infrastructure is progressively migrating towards a model in which an optical core network able to handle high traffic volumes interconnects high throughput routers. In addition, a massive migration of a large part of services is next to occur towards the IP paradigm, including real time and multimedia services and next generation mobile services.

Such a huge amount of data requires appropriate communications means suitable to cope with such high volumes of data traffic, for instance high capacity optical networks exploited through Wavelength Division Multiplexing (WDM) techniques.

Conventionally, routing of packets in an IP based network is performed entirely at the network layer. Upon a data packet arriving at a network node, or router, the network-layer process operating at the node compares a destination address included with the packet to a list of address prefixes stored within a routing table maintained at the node. A longest match prefix is searched for and, upon finding, the packet is forwarded to another node associated with such prefix. The matching process is then repeated at the current node, until the packet destination address is reached.

Of course, several paths may exist in the network leading from a start node to a final destination node. The calculation of an optimal path is a key operation in network engineering and it is the basis for an efficient network performance.

In this context, four layers are typically identified in practice in today's multi-layer data networks: an IP layer for carrying applications and services, an asynchronous transfer mode (ATM) layer for traffic engineering, a SONET/SDH layer for transport and a wavelength-division multiplexing (WDM) layer for capacity.

Unfortunately, such traditional multi-layer architectures suffer from the lowest common denominator effect where one layer can limit the scalability of the entire network and they have proven to be not only also cost ineffective but also hard and slow to scale for very large volumes of traffic.

In fact, since four layers are involved in the actual transport of a packet across the network, calculation of a path, which is carried out in order to optimise performance at a certain layer, is affected by the behaviour in the other three layers.

For these reasons, engineering solutions addressing the issue of using IP over optical networks have therefore been proposed in the state of art, reducing the number of layers to a total of two.

However, even in this shrunk architecture, solutions reported so far either aim at optimising the IP routing process in an Internet network by adopting a proper paradigm, for instance the Multi-Protocol Label Switching (MPLS) one, or to increase the performance of optical networks.

More in detail, MPLS technology has been developed to reduce the amount of time and computational resources used in network routing mechanisms.

MPLS replaces the need to do the longest prefix match at each router by inserting a fixed length label between the network layer header and the link layer header of each data packet. A router can thus easily make a hop decision for an incoming packet merely by using the MPLS label of the packet as an index into a routing table, so decreasing the effort and time required to forward the data packet from a node to another and thus increasing network performance. A detailed description of MPLS is found in E. Rosen et al., Multiprotocol Label Switching Architecture, Internet Draft draft-ietf-mpls-arch-07.txt, Internet Enegineering Task Force (IETF) Network Working Group, January 2001, which is herein incorporated for reference in its entirety.

On the other hand, state of the art the solutions dealing with optical networks refer to the wavelength routing and wavelength assignment problem, usually known as RWA, a problem which may be solved either off-line or on-line.

In the former case, an expected traffic matrix representing the required connections in terms of the number of "wavelengths" that need to be accommodated for each pair of source/destination optical nodes, like optical cross-connects, is used.

In the latter case, the RWA problem is solved dynamically on the basis of requests that arrive with a certain statistic.

Both the IP/MPLS and RWA engineering approaches, however, have not proven to be fully satisfactory, in that optimisation in a layer is still too often affected by critical loads or different situations occurring on the other layer.

Therefore, a need exists in the field for a new strategy relating to a multi-layer network.

SUMMARY OF THE INVENTION

Aim of the present invention is to provide a method and a system for exploiting available network resources so as to improve network performance.

Within this aim, an object of the present invention is to provide dynamic routing strategies and algorithms in a multi-layer network.

Another object of the present invention is to extend known solutions in a multi-layer environment and to implement new criteria based on a proper evaluation of a multi-layer network as a whole, as permitted by the Generalized Multi-Protocol Label Switching (GMPLS) paradigm, which allows the integration of both the MPLS and the optical domain.

This aim, this object and others, which will become apparent hereinafter, are achieved by a method of routing data packets across a multi-layer network including a plurality of nodes, a logical level provided with a plurality of logical links and a physical level provided with a plurality of physical links, each of the logical links corresponding to at least one of the physical links, the method comprising the steps of: with respect to a first critical constraint in the logical level, assigning a weight to each logical link; with respect to a second critical constraint in the physical level, refining the weight assigned to each logical link; based on the weights assigned to each link, computing a path at the logical level connecting a start node to an end node for the transport of the data packets.

Conveniently, the first critical constraint may be an aggregate bandwidth between two logical links, calculated as the sum of all the available bandwidths of the corresponding physical links, while the second critical constraint may be the actual bandwidth available over single physical links.

Advantageously, the weight, and a function evaluating such weights, may be based on information concerning hop count; available capacity or capacity distribution among links.

According to a more specific aspect of the invention, it is provided a method of routing data packets across a multi-layer network including a plurality of nodes, a Multi-Protocol Label Switching (MPLS) layer provided with a plurality of logical links and an optical layer provided with a plurality of physical optical links, each of the MPLS links corresponding to at least one of the optical links, the method comprising the steps of: with respect to a first critical constraint in the logical level, assigning a weight to each logical link; with respect to a second critical constraint in the physical level, refining the weight assigned to each logical link; based on the weights assigned to each link, computing a Label Switched Path (LSP) at the MPLS layer connecting a start node to an end node for the transport of the data packets.

The optical layer may be any suitable layer, like a Wavelength Division Multiplexing (WDM) layer or a Dense Wavelength Division Multiplexing (DWDM) layer.

The above aim and objects are also achieved by a network control program for routing data packets across a multi-layer network, which network includes a plurality of nodes, a logical level provided with a plurality of logical links and a physical level provided with a plurality of physical links, each of the logical links corresponding to at least one of the physical links, the network control program comprising: means for assigning a weight to each logical link, with respect to a first critical constraint in the logical level; means for refining the weight assigned to each logical link, with respect to a second critical constraint in the physical level; means for computing a path in the logical level connecting a start node to an end node for the transport of the data packets, based on the weights assigned to each link.

The network control program may further comprise means for checking actual availability of physical links for each of the logical links in the computed path and means for selecting a physical link within the logical link, according to predefined criteria.

A multi-layer network managed according to the invention as claimed achieves a better performance in comparison with the state of the art, with particular referral to blocking probability and total refused bandwidth.

BRIEF DESCRIPTION OF THE DRAWINGS

Further characteristics and advantages of the present invention will become apparent from the following detailed description, given by way of a non limitative example and illustrated in the accompanying figures, wherein.

DETAILED DESCRIPTION OF A PREFERRED EMBODIMENT

Figure 1:
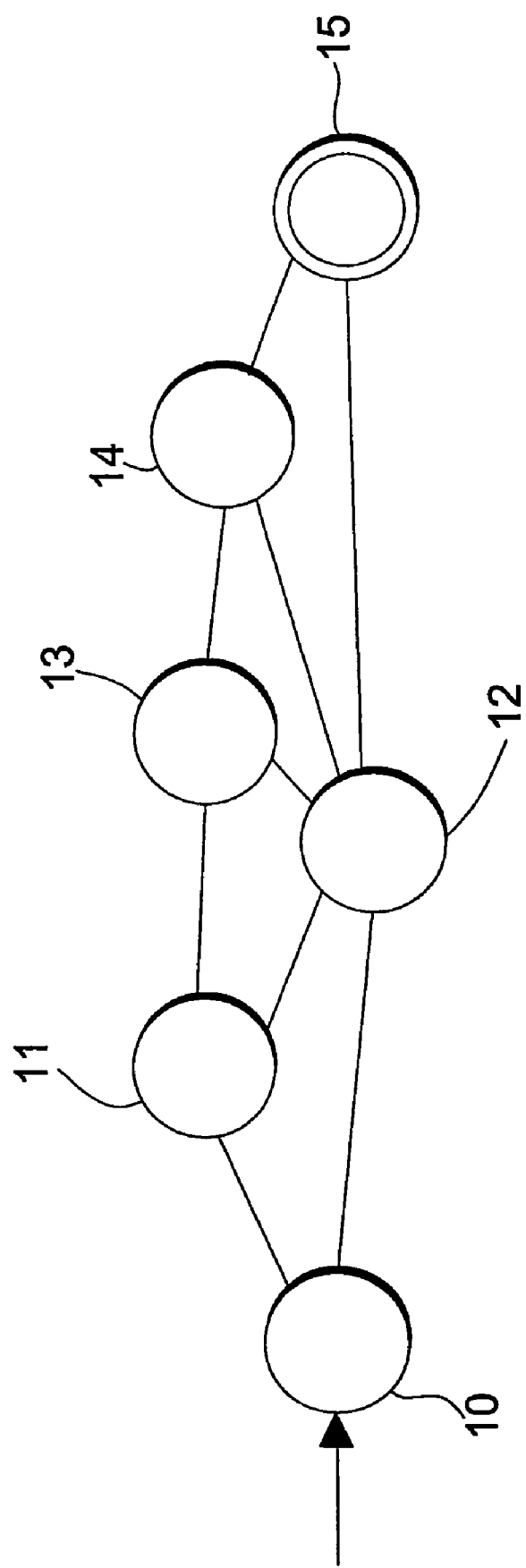
FIG. 1 is a schematic view showing an exemplary communications network.

FIG. 1 is a schematic view showing an exemplary communications network comprising a plurality of nodes 10 to 15 and an exemplary data packet which is to travel from start node 10 to end node 15.

The nodes are treated in two different levels or domains: a logical or routing level and a physical level.

Each node in the logical domain is associated to a router, hereinafter indicated with the same reference number as the corresponding node, which performs the necessary actions to route an incoming data packet to a next node along a path leading to the final packet destination address.

Similarly, each node in the physical domain is associated to a switch, which performs the necessary actions to physically transfer an incoming data packet to the next switch through a selected physical transport means.

A generic connection between two nodes, namely a source node and a destination node, as treated in the logical domain, is referred to as a logical link, while the actual means capable of connecting two nodes in the physical domain is referred to as a physical link.

At least one physical link must exist for each logical link, wherein most logical links actually correspond to a plurality of physical links, each of which is able to physically transport a data packet of a certain size from a node at a first end of the link to the node at the other end of the link.

According to a preferred embodiment hereby disclosed, the routing domain is an MPLS or GMPLS domain, while the physical domain is an optical domain.

Therefore, for clarity reasons, the invention will then be now described in detail explicitly referring to GMPLS and optical layers. However, the skilled in the art will easily appreciate that the same inventive concept applies to any other connection oriented network architecture applied over optical layers or physical layers in general.

Figure 2:
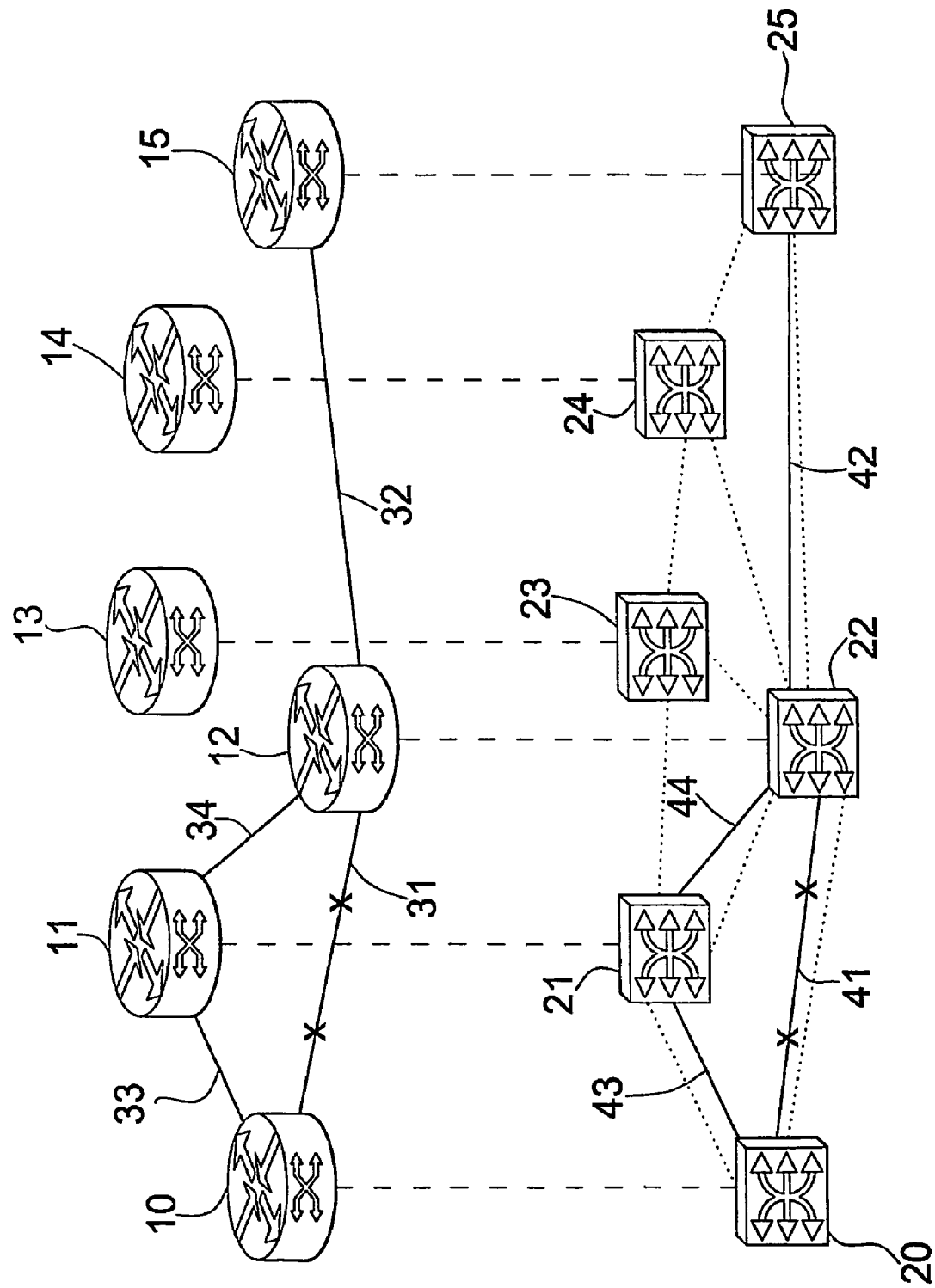
FIG. 2 is schematic view showing an exemplary multi-layer communications network comprising a plurality of nodes associated to Label Switched Routers in a MPLS domain and Optical Cross Connects in an optical domain.

FIG. 2 is a schematic view showing an exemplary multi-layer communications network comprising a plurality of Label Switched Routers (LSR) 10 to 15 in an MPLS domain and a plurality of optical routers, preferably Optical Cross Connects (OXC) 20 to 25 in the optical domain, performing wavelength routing. To this purpose, any type of OXC may be used.

Each LSR 10-15 in the MPLS domain is associated to one of the OXCs 20-25 in the optical domain and is capable of handling Label Switched Paths (LSP) for forwarding data packets between any two distinct endpoint network elements, hereby indicated as the start point 10 and the end point 15.

It shall be noted that FIG. 2 is so configured for a best understanding of the present invention, and does not necessarily reflect the actual physical architecture of the network. Particularly, FIG. 2 shows a one to one relationship between MPLS routers and OXCs. In truth, a link connecting two MPLS routers may easily correspond to a connection comprising a plurality of intermediate OXCs, even if only the two OXCs at the ends of the link are thereby illustrated.

For instance, link 41 may be either a direct link between OXC 20 and OXC 22 or a indirect link, wherein wavelengths connecting the two OXCs go through an intermediate OXC, not shown in the figure, which is not associated to a corresponding MPLS router.

FIG. 2 further shows a first LSP 31, 32 in the MPLS domain for transferring a data packet from node 10 to node 15, which corresponds to path 41-42, establishing a connection between node 20 and node 25.

Finally, FIG. 2 shows a second LSP 33, 34, 32; which is the actual path followed by the data packet in its journey from start point 20 to end point 25, as it will be described hereafter, and a corresponding path 43, 44 and 42.

Figure 3:
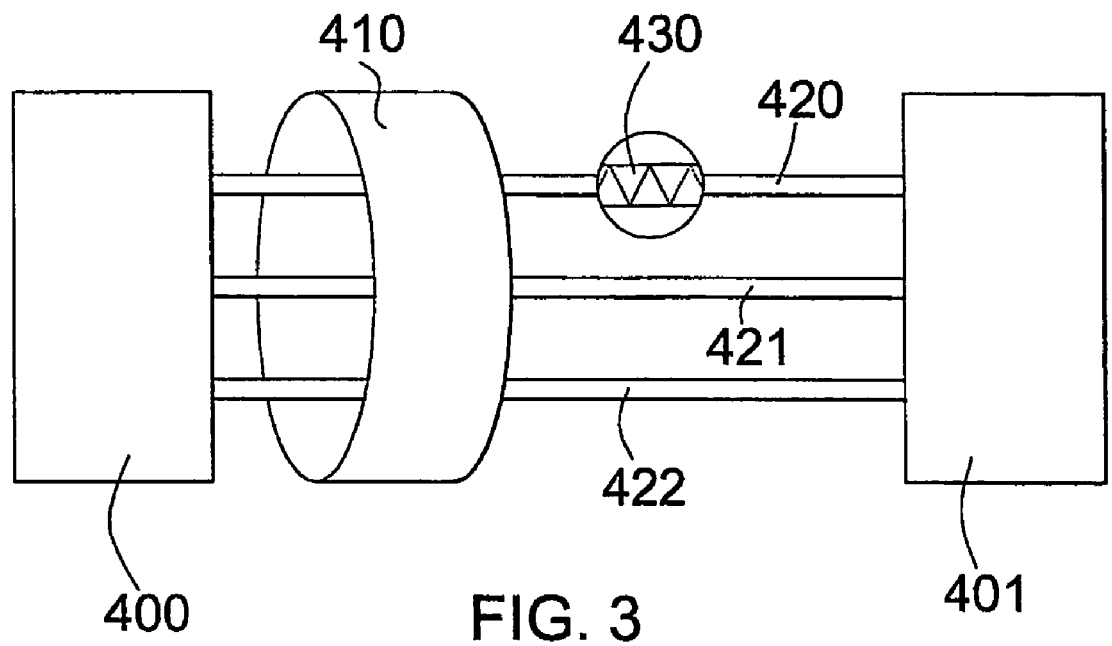
FIG. 3 is schematic view exploding a link between two nodes to reveal several physical links corresponding to a logical link.

An exemplary link is exploded in FIG. 3 to reveal several optical fibres 420, 421, 422 connecting node 400 to node 401. In turn, optical fibre 420 is partially zoomed in the figure to reveal a pictorial representation of one of a number of wavelengths 430 of a certain capacity suitable for physically transporting data over the link.

Reference number 410 indicates an aggregate critical resource calculated as the sum of single resources available on each physical link, for instance the total capacity of the logical link.

A network control program, not shown in the figures, is in charge of calculating a path for the data packet leading from start point 10 to end point 15.

The network control program learns network state information by means of signalling protocols, for instance the OSPF protocol. For each link, state information comprises the status of the link, the topology, the connectivity among the network nodes and the available bandwidth on each wavelength.

Storage of such information is carried out according to traditional methods and techniques, and is therefore not described in detail. For instance, the information may be stored on each node in a table which is accessed by the corresponding router for the routing of an incoming packet and by the network control program for establishing the path from the start-point to the final destination of the packet.

In any case, the network control program must be able to access information regarding both the MPLS layer and the optical layer. In the preferred embodiment, the GMPLS paradigm is adopted, which allows the network control can access information regarding both the MPLS layer and the optical nodes.

Figure 5:
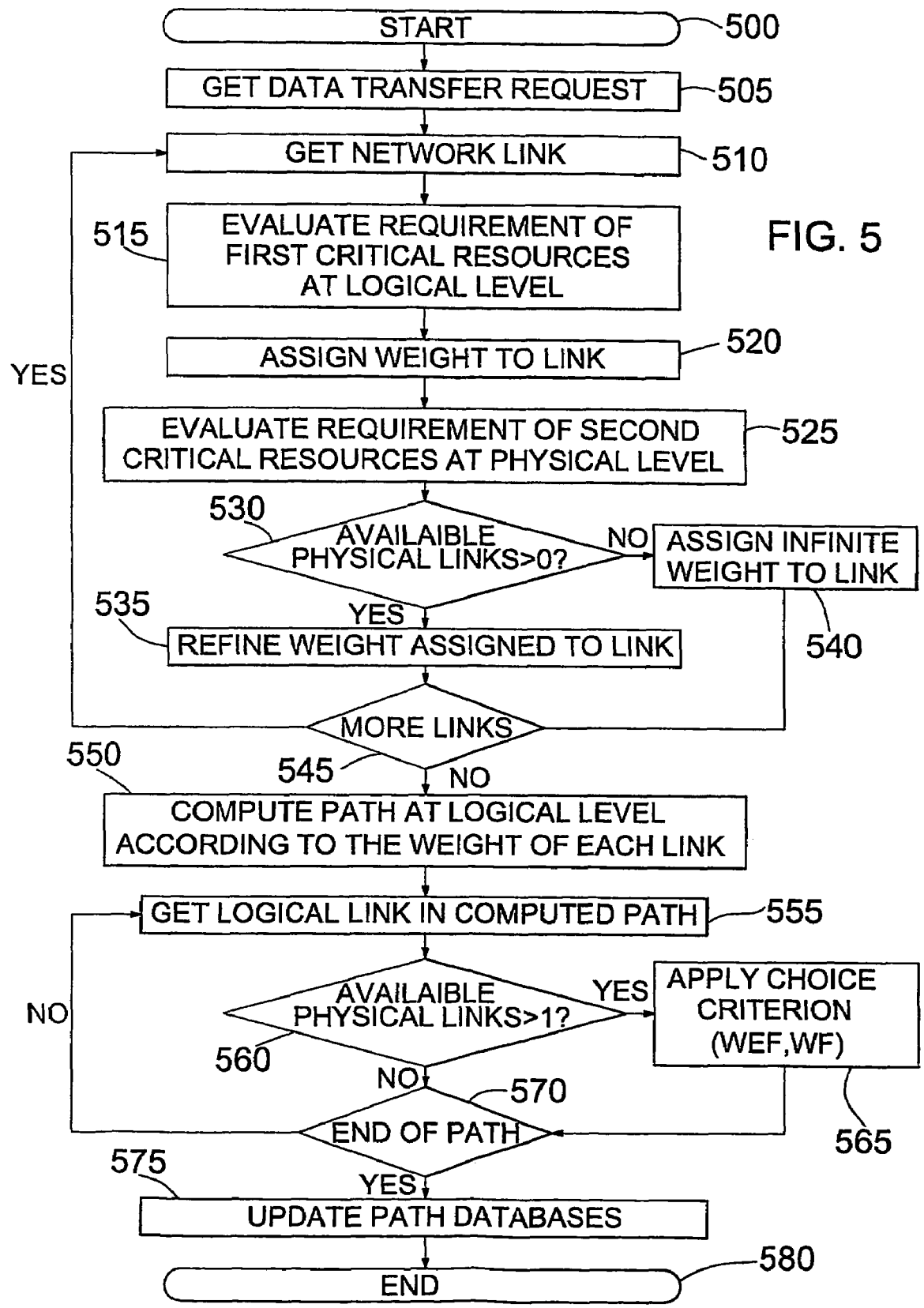
FIG. 5 is a data flow diagram illustrating the steps according to the disclosed method.

The operation of the method and of the system according to the present invention is depicted in the data flow diagram 500 of FIG. 5. Such data flow diagram will be now illustrated supposing that information is to be transferred from node 10 to node 15, so that an LSP is to be set connecting the two nodes.

At block 505 the network control program is informed that a path must be set up to transfer a data packet, or a plurality of data packets, embedding the information from start node 10 to end node 15, and an analysis of the network links is started at step 510 by considering a first link in the network, connecting node i to node j.

At step 515-520 the link is treated at a logical level and assigned a weight or weight function w(i,j) indicating the cost at of using the link for the transport of the data packet, which cost refers to one or more first critical constraints or required resources.

For instance, in this exemplary case, the total available link bandwidth 410 may play the role of the first critical resource or constraint.

At step 525, information specifically regarding the physical level is taken into account checking for availability at the physical level of an actual physical link able to meet the requirements of a second critical resource or second constraint, which may be an equivalent, or be influenced by, the first resource or constraint taken into account at the logical level.

However, the second critical resource may also be an independent constraint which is critical to the correct operation of the optical layer irrespective of the status of the IP or logical layer.

In this case, it is assumed that the second constraint is the availability of bandwidth at the wavelength level: a check is therefore performed at step 530 to determine if at least one wavelength is available within the link to accommodate the actual transfer of the data packet.

In the case that no physical link is capable of physically accommodating the connection for the link, the weight previously assigned to the link is set to infinite (step 540), which indicates that the link is not usable.

By way of example, FIG. 2 shows that no physical link is able to provide the amount of bandwidth required to carry out a data transport between node 20 and node 22, so that the path to be computed shall not comprise the link connecting nodes 10 and 12.

On the other hand, if one or more physical links are capable to accommodate the data transfer between the nodes at the two ends of the link, the weight previously assigned to the link is modified and refined (step 535) according to the availability of the second resource and a final weight is assigned to the link. The weight thus keeps into account both aggregate information concerning the link and specific availability of physical resources.

Finally, at step 545, a test is made to check whether more links exist in the network, in which case the process jumps back to step 510 and the process is repeated on the next link.

Eventually, each link in the network is assigned a weight, and the network control program is now able to compute an optimal path at the logical level or a Label Switched Path, according to traditional state of the art algorithms.

For instance, the Dijkstra algorithm, which is suitable for computing a route having a minimum cost for a given pair of start and end nodes, may be adopted (step 550). FIG. 2 indicates an optimal LSP consisting of links 33, 34 and 32.

The bottom half of the data flow diagram depicted in FIG. 5 shows an other aspect of the invention suitable for further optimising the data transfer from a start node to an end node.

At step 555, the first link in the LSP or logical path is fetched and a check is made at step 560 on the amount of physical links, in this case wavelengths, that may be used to physically accommodate the data transport.

If more than one link is available, a criterion is applied at step 565 to select the most appropriate physical link, as will be better detailed hereafter, otherwise the only available one is picked.

If more segments exist in the logical path or LSP (step 570), the algorithm jumps back to step 555 and the process is repeated on the next link in the LSP.

Finally, at step 575 the links belonging to the computed path are stored in a dedicated database, not shown, which is used by the network control program for tearing down the LSP once the data transfer is over, while the selected physical link is stored in a dedicated database storing information concerning the status and occupation of physical links and the end of the process is reached (step 580).

In more detail, steps 515-520 aim at setting a first weight to each link of the network, useful for finding an optimal route with respect to a constraint based metric considered at the logical level and usually corresponding to aggregate information concerning the physical level: available bandwidth is usually the most relevant one. In this stage, as mentioned, the available bandwidth is considered on a whole link, and is calculated as the sum of all of the spare bandwidths available over all the wavelengths in all the fibres that constitute the link. This value is referred to as aggregate information for routing.

In the preferred embodiment hereby disclosed, the most relevant factors used to determine the weight of each link are hop count and available capacity. A third factor, namely capacity distribution, will be introduced at a later stage.

Specifically, the hop count function aims at minimising the number of hops in the MPLS network, in order to minimise the routing overhead introduced at each logical node As regards available capacity, the amount of available capacity on the link when the link state information is gathered is indicated with $C_i^{AL}$. Therefore, $1/C_i^{AL}$ represents the measure of the resistance offered by the link for establishing a new session. The greater the available capacity of a link, the lower the resistance it offers.

A preferred weight function is $w(i)=C_{max}^{TL}/C_i^{AL}$, where $C_{max}^{TL}$ is the maximum link total capacity in the network.

Such weight function is used to define the least resistance in the network, applied to a single scenario.

However, the skilled in the art understands that the available bandwidth on the link does not give information on how capacity is distributed in each link: $C_i^{AL}$ is in the fact the sum of all the spare capacities of all wavelengths in all the fibres that constitute the link, but no indications are given with regard to how actual capacity is distributed over the wavelengths in the fibres.

On the other hand, since one LSP must necessarily be carried by a single wavelength, the routing algorithm must take this factor into account.

In fact, even though the information of capacity tells that the link has more capacity than the one required to establish the new LSP connection, it is still possible that no wavelength exists in that link to which the LSP may be bundled.

For these reasons, steps 525-540 take into detailed consideration the optical layer and, in particular, the actual bandwidth distribution and availability in each single wavelength in the link, in order to find at least one wavelength that can actually bundle the new LSP connection.

If such a wavelength does not exist, the weight function for the link is then set to "infinite" and a new LSP is computed. The "infinite" value will prevent the network control program from selecting the discarded link.

Figure 4:
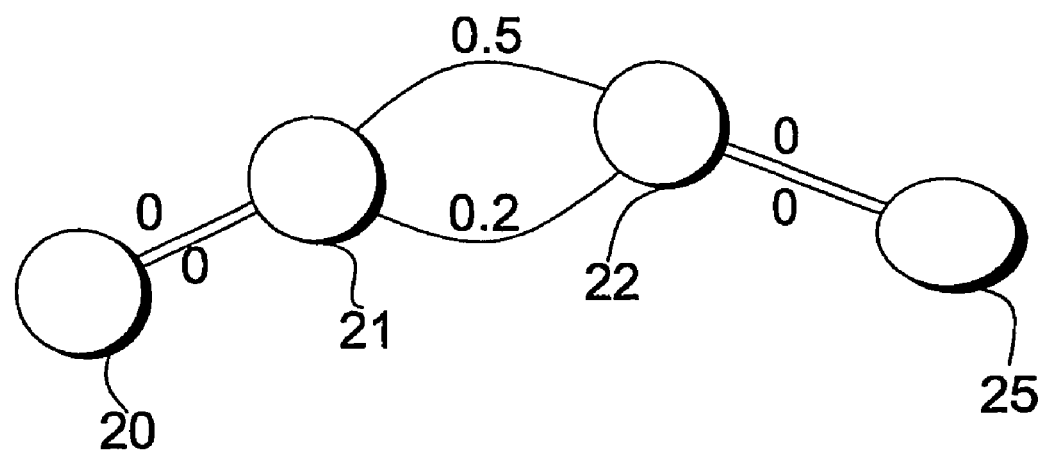
FIG. 4 is schematic view of some nodes in the network illustrating wavelength occupation.

On the contrary, in the case that more than one wavelength is available for accommodating the data transport, the network control program takes care of selecting the most suitable one, according to predefined criteria in order to guarantee optimum network performance, as now explained in detail with referral to FIG. 4, which is an illustrative example showing four nodes selected by the routing algorithm for an LSP.

FIG. 4 shows nodes 20, 21, 22 and 25. For illustrative purposes, two physical links are shown between each pair of nodes, each link showing its own free capacity expressed in an appropriate unit of measure, typically Mb/s or Gb/s. For the sake of simplicity, it may be assumed that each physical link in the logical link is provided with a same capacity, but this is not a constraint to the present disclosure.

Particularly, two partially filled wavelengths exist having enough residual capacity to host the transport of data within the logical link connecting nodes 21 to node 22. The first wavelength has a free capacity of 0.5 Mb/s, while the second wavelength has a free capacity of 0.3 Mb/s.

In the preferred embodiment, the network control may be programmed so as to select the wavelength which is most loaded or which has the least free capacity. This selection criterion, which is hereinafter referred to as the WF (wavelength filled) criterion, maximises the probability to find at least one wavelength available for other connections requiring large capacity.

A second preferred criterion, hereinafter referred to as WEF (wavelength evenly filled) criterion, selects the wavelength which is least loaded or which has the largest residual capacity, so as to provide for an even distribution of data in the available wavelength.

To better understand the major advantages introduced by the present method as a whole and the different specific advantages brought by the two preferred criteria above described, the performance of the routing strategy according to the inventive concept underlying the present invention has been compared to state of the art routing algorithms, namely the so called "shortest path" algorithm, "min hop" algorithm and "least resistance" algorithm.

In all of the reported test cases, performance was evaluated in terms of blocking portability, which indicates the probability that a request is not accommodated, and total refused bandwidth, which indicates the cumulative bandwidth resulting by all the requests that have not been accommodated.

Reported results refer to the case of a network topology of eight nodes. However, the skilled in the art will appreciate that the results would not vary from the qualitative point of view if topologies with a different number of nodes were considered. Finally, the connection requests arriving at each node are supposed to follow a Poisson distribution.

Figure 6:
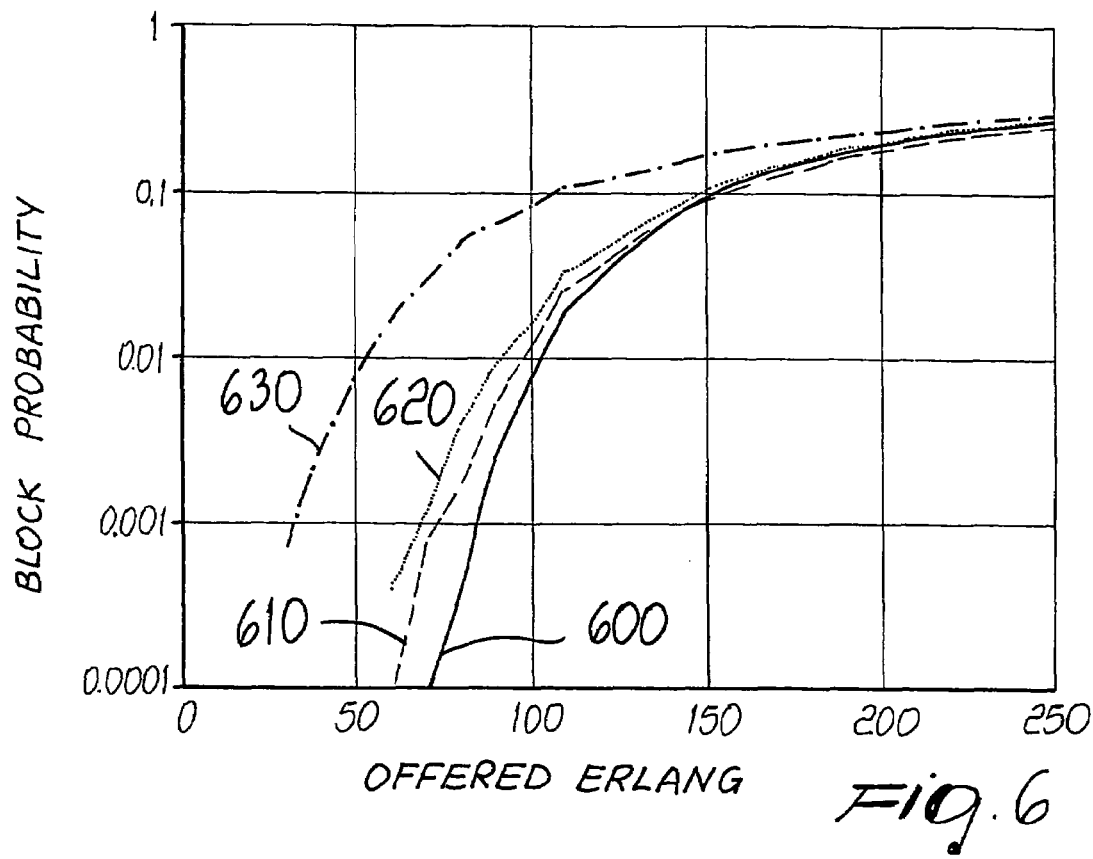
FIGS. 6 to 9 are diagrams comparing performances obtained by different criteria used in the choice of a physical link as provided for by the present disclosure.

FIG. 6 reports the blocking probability for an LSP connection request versus the offered traffic load expressed in Erlang.

Line 600 refers to the results achieved by a method according to the present invention, while lines 610, 620 and 630 refer to the "least resistance" algorithm, "min hop" algorithm and the "shortest path" algorithm respectively.

FIG. 6 shows that the routing strategy according to the present invention outperforms all other strategies under test until the network is loaded with such a large amount of traffic that the rejection of large portions of the requests made is to be expected and all performances become unacceptable.

Figure 7:
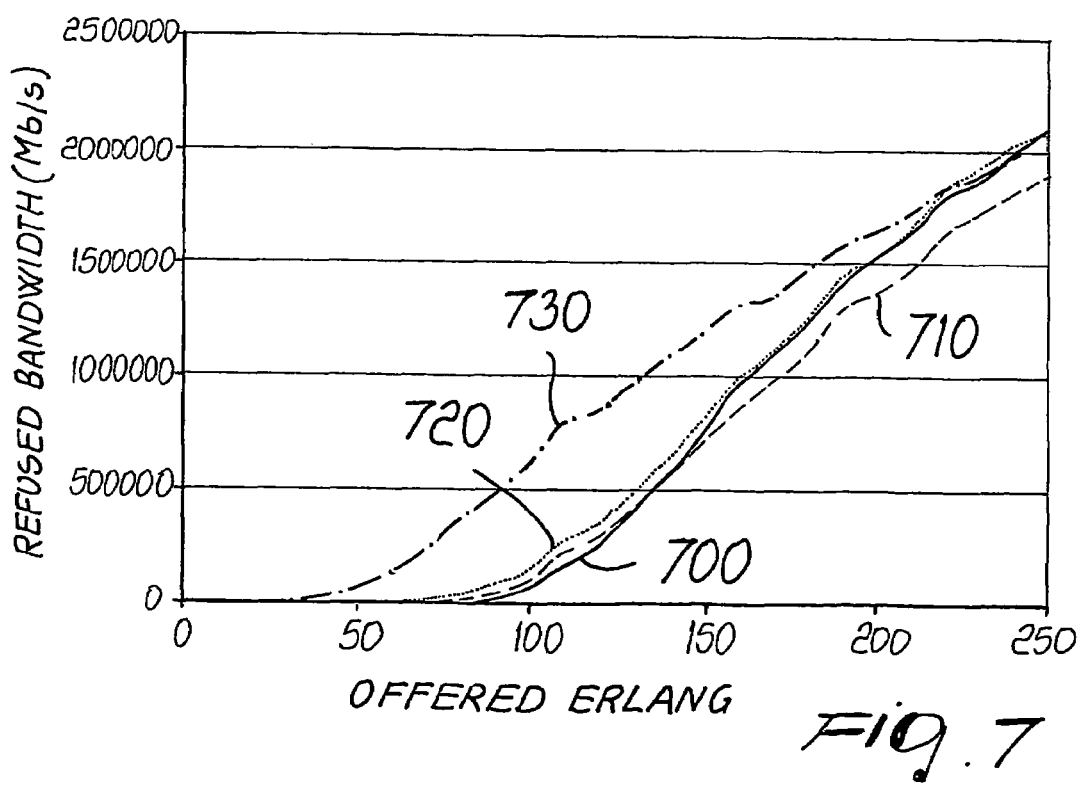

FIG. 7 depicts the total refused bandwidth, calculated as the sum of all refused LSP requests, versus the offered traffic load expressed in Erlang.

Line 700 refers to the results achieved by a method according to the present invention, while lines 710, 720 and 730 refer to the "least resistance" algorithm, "min hop" algorithm and the "shortest path" algorithm respectively.

Once again, the routing strategy according to the present invention outperforms all other strategies under test until the network is loaded with a reasonable amount of traffic.

It shall be noted that, as expected, the "shortest path" algorithm gives better results when the network is highly congested. This is a well known characteristic of the shortest path algorithm with respect to any constraint based routing algorithm, and it is explained by the knowledge that, when level of traffic congestion reaches a critical value, the best results are unavoidably reached by the algorithm that uses less network resources. However, it shall be noted that the "shortest path" algorithm performs better than the routing strategy according to the present invention when the occupied link capacity reaches 70% and the blocking probability becomes unacceptable (over 10%), which conditions are clearly meaningless in practical cases.

Figure 8:
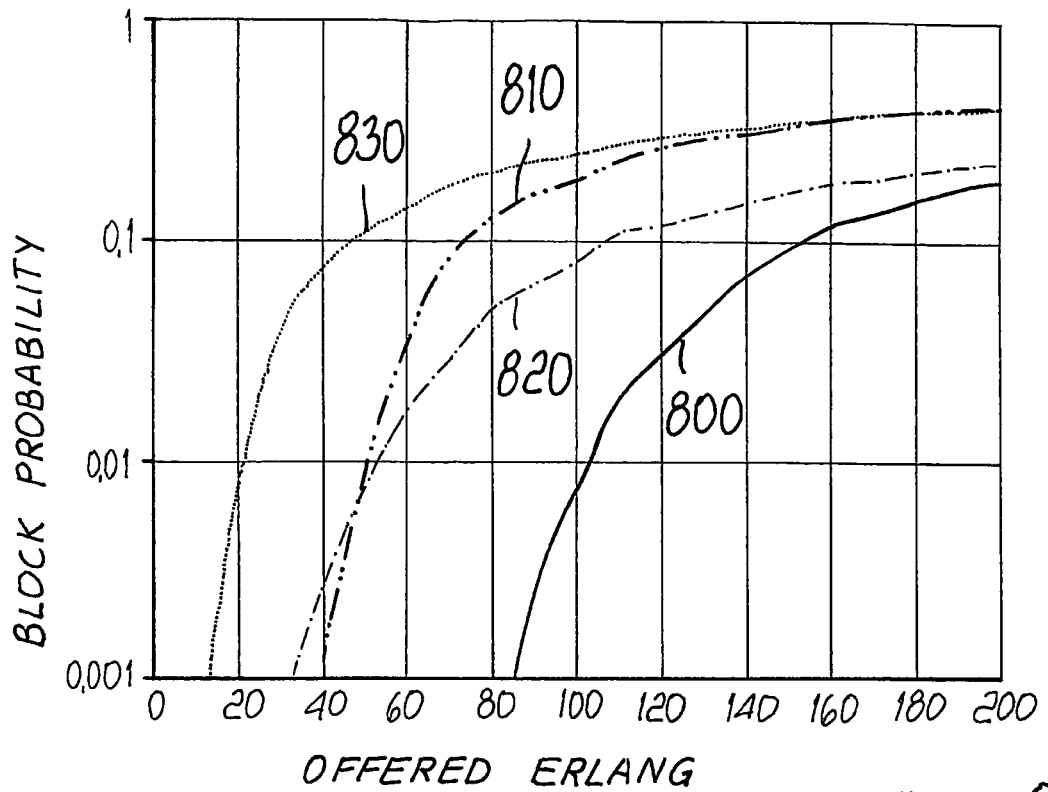

FIG. 8 reports the blocking probability versus the offered traffic load expressed in Erlang when different criteria are used in distributing capacity over individual wavelengths.

Lines 800 and 810 respectively refer to the results achieved when the disclosed WF and WEF criteria are applied to the strategy method according to the present invention, while line 820 and 830 refer to the results obtained when the same criteria are applied to the "shortest path" algorithm.

The figure shows that the routing strategy together with the WF capacity distribution according to the present invention outperforms all other strategies, while the second best performance is given by another preferred embodiment of the present invention, a WEF capacity distribution applied to a the proposed routing strategy, when the traffic load is at a meaningful level.

Figure 9:
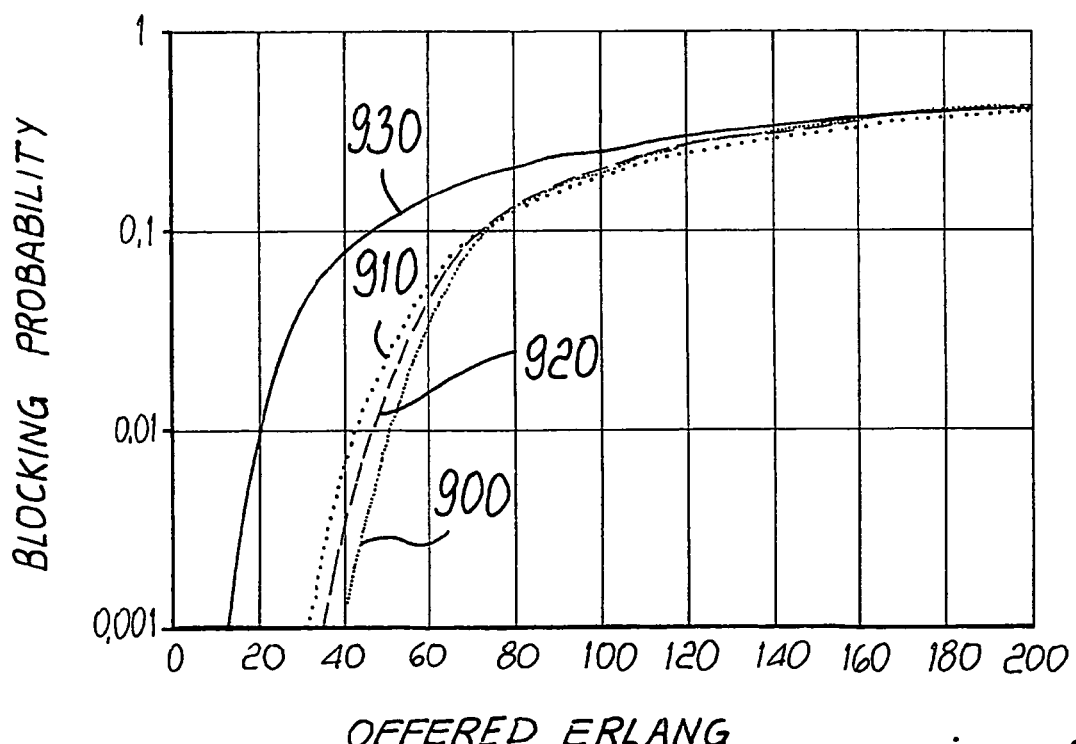

Finally, with referral to FIG. 9, a comparison is provided between the routing strategy according to the present invention and all other strategies with regard to blocking probability refused bandwidth versus offered traffic expressed in Erlang, where Line 900 refers to the routing strategy according to the present invention, while lines 910, 920 and 930 refer to the "least resistance" algorithm, "min hop" algorithm and the "shortest path" algorithm respectively.

The figure shows that the routing strategy according to the present invention provides for the best performance; irrespective of the wavelength choice criterion.

It has thus been shown that the present invention fulfils the proposed aim and objects. Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A method of routing data packets across a multi-layer network including a plurality of nodes, a logical level provided with a plurality of logical links and a physical level provided with a plurality of physical links, each of the logical links corresponding to at least one of the physical links, the method comprising the steps of:
   a) with respect to a first critical constraint in the logical level, assigning a weight to each logical link, said weight based on at least one of hop count, available capacity and capacity distribution;
   b) with respect to a second critical constraint in the physical level, refining the weight assigned to each logical link according to requirements of the second critical constraint; and
   c) based on the weights assigned to each link, computing a path at the logical level connecting a start node to an end node for the transport of the data packets.

2. The method according to claim 1, wherein the first critical constraint is an aggregate bandwidth available on a logical link, calculated as the sum of all bandwidths of the corresponding physical links.

3. The method according to claim 2, wherein the second critical constraint is a bandwidth available on each physical link corresponding to a logical link.

4. The method according to claim 1, further comprising the steps of:
   d) checking availability of physical links for each of the logical links in the computed path; and
   e) selecting a physical link corresponding to a logical link.

5. The method according to claim 4, wherein the step of selecting a physical link further comprises selecting a most loaded physical link.

6. The method according to claim 5, wherein the step of selecting a physical link further comprises selecting a least loaded physical link.

7. A method of routing data packets across a multi-layer network including a plurality of nodes, a Multi-Protocol Label Switching (MPLS) layer provided with a plurality of logical links and an optical layer provided with a plurality of physical optical links, each of the logical links corresponding to at least one of the optical links, the method comprising the steps of:
   a) with respect to a first critical constraint in the MPLS layer associated with the plurality of logical links, assigning a weight to each logical link, said weight based on at least one of hop count, available capacity and capacity distribution;
   b) with respect to a second critical constraint in a physical level associated with the plurality of physical optical links, refining the weight assigned to each logical link according to requirements of the second critical constraint; and
   c) based on the weights assigned to each link, computing a Label Switched Path (LSP) at the MPLS layer connecting a start node to an end node for the transport of the data packets.

8. The method according to claim 7, wherein said optical layer is a Wavelength Division Multiplexing (WDM) layer or a Dense Wavelength Division Multiplexing (DWDM) layer.

9. The method according to claim 7, wherein the first critical constraint is an aggregate bandwidth between two logical links, calculated as the sum of all bandwidths of corresponding physical links.

10. The method according to claim 7, wherein the second critical constraint is bandwidth available between two physical links.

11. The method according to claim 7, further comprising the step of:
   d) checking availability of physical links for each of the logical links in the computed LSP; and
   e) selecting a physical link within the LSP.

12. The method according to claim 11, wherein the step of selecting a physical link further comprises selecting a most loaded wavelength.

13. The method according to claim 11, wherein the step of selecting a physical link further comprises selecting a least loaded wavelength.

* * * * *

UNITED STATES PATENT AND TRADEMARK OFFICE
CERTIFICATE OF CORRECTION

PATENT NO. : 7,539,210 B2
APPLICATION NO. : 10/514584
DATED : May 26, 2009
INVENTOR(S) : Iovanna et al.

It is certified that error appears in the above-identified patent and that said Letters Patent is hereby corrected as shown below:

On the Title Page, in Field (73), under "Assignee", in Column 1, Line 1, delete "Ericcson" and insert -- Ericsson --, therefor.

Title Page 2, in Field (56), under "OTHER PUBLICATIONS", in Column 1, Line 3, after "2001," delete "-2001".

In Column 2, Line 61, delete "Enegineering" and insert -- Engineering --, therefor.

In Column 3, Line 49, delete "count;" and insert -- count, --, therefor.

In Column 7, Line 53, delete "node" and insert -- node. --, therefor.

In Column 9, Line 59, delete "performance;" and insert -- performance, --, therefor.

Signed and Sealed this

Seventeenth Day of November, 2009

David J. Kappos
*Director of the United States Patent and Trademark Office*